(12) United States Patent
Agarwal et al.

(10) Patent No.: US 12,242,485 B2
(45) Date of Patent: Mar. 4, 2025

(54) DICTIONARY FILTERING AND EVALUATION IN COLUMNAR DATABASES

(71) Applicant: Databricks, Inc., San Francisco, CA (US)

(72) Inventors: Utkarsh Agarwal, San Francisco, CA (US); Shoumik Palkar, San Francisco, CA (US); Alexander Behm, San Francisco, CA (US); Sriram Krishnamurthy, San Francisco, CA (US)

(73) Assignee: Databricks, Inc., San Francisco, CA (US)

( * ) Notice: Subject to any disclaimer, the term of this patent is extended or adjusted under 35 U.S.C. 154(b) by 0 days.

(21) Appl. No.: 18/162,616

(22) Filed: Jan. 31, 2023

(65) Prior Publication Data

US 2024/0256550 A1    Aug. 1, 2024

(51) Int. Cl.
*G06F 16/24* (2019.01)
*G06F 11/34* (2006.01)
*G06F 16/22* (2019.01)
*G06F 16/2455* (2019.01)

(52) U.S. Cl.
CPC .... *G06F 16/24558* (2019.01); *G06F 11/3409* (2013.01); *G06F 16/221* (2019.01)

(58) Field of Classification Search
CPC .................................. G06F 16/24558
USPC ........................................................ 707/713
See application file for complete search history.

(56) References Cited

U.S. PATENT DOCUMENTS

2018/0075105 A1\* 3/2018 Chavan ............. G06F 16/24537
2018/0150494 A1\* 5/2018 Schulze ................ G06F 16/221

FOREIGN PATENT DOCUMENTS

CN       107851123 B  * 10/2021  ......... G06F 16/2282

\* cited by examiner

*Primary Examiner* — Syling Yen
(74) *Attorney, Agent, or Firm* — Fenwick & West LLP

(57) ABSTRACT

Disclosed herein is a method, system, or non-transitory computer readable medium for evaluating a query on a columnar dataset comprising one or more dictionaries associated with columns in the dataset. The method includes receiving a request to perform a query comprising at least a operator and a request to return information about a value of interest in a columnar dataset stored on cloud storage. At least one column in the columnar dataset is based on a dictionary. The dictionary maps one or more values for a column to one or more respective identifiers. The method determines whether to perform dictionary filtering for the query by calculating a metric based on one or more factors. Responsive to the metric being below a threshold, which may be predetermined, the method performs the dictionary filtering.

20 Claims, 8 Drawing Sheets

DICTIONARY FILTERING AND EVALUATION IN COLUMNAR DATABASES

TECHNICAL FIELD

The disclosed configuration relates to accessing data in columnar databases for query processing.

BACKGROUND

Cloud-based object storage systems enable companies, individuals, and other entities to store and access large datasets. Multiple cloud-based storage systems are commonly used, such as AMAZON Web Services, GOOGLE Cloud Platform, IBM Cloud Services, MICROSOFT Azure, and other largescale cloud service providers. Typically, a structured query language (SQL) encoded query is provided to a data management system. SQL is an example of a declarative language for talking to databases. A SQL query may be run on a columnar dataset including a multitude of columns and rows. SQL queries typically query over rows in a columnar data storage. For example, Apache Parquet is an open-source, column-oriented data storage frequently used in cloud storage. However, running a query on a columnar database frequently requires fetching entire columns of the database. This is an expensive and inefficient task. If columns are very large, fetching the entire columns and then performing filtering may be unnecessarily expensive if the filter returns no values. Additionally, in cases where a query is expensive, the cloud-based storage system may throttle the query and slow down the run time further. There is lacking, inter alia, an efficient technique for running queries on cloud-based columnar datasets.

The figures depict various embodiments of the disclosed configurations for purposes of illustration only. One skilled in the art will readily recognize from the following discussion that alternative embodiments of the structures and methods illustrated herein may be employed without departing from the principles of the invention described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Disclosed are configurations (e.g., method, system, and/or non-transitory computer readable storage medium comprising stored instructions) for an alternative approach to running queries on data sets. In one example embodiment, a configuration includes receiving a request to perform a query. The query contains at least an operator and a request to return information about a value of interest in a columnar dataset stored on cloud storage. At least one column in the columnar dataset is based on a dictionary. The dictionary maps one or more values for the one column to one or more respective identifiers. The configuration determines whether to perform dictionary filtering for the query by calculating a metric based on one or more factors. The one or more factors include at least a dictionary size and an estimated cost of executing the query. Dictionary filtering may include determining whether the value of interest is present in the dictionary for the column before the column is retrieved from the cloud storage. In some embodiments, dictionary filtering may include determining whether a value of interest is present in the dictionary for the column before the column is decoded and filtered. Responsive to the metric being below a threshold, the configuration performs dictionary filtering. Responsive to the metric being equal to or above a threshold, the configuration retrieves the column associated with the dictionary and determines whether the value of interest is present in the column.

Example System Environment

Figure 1:
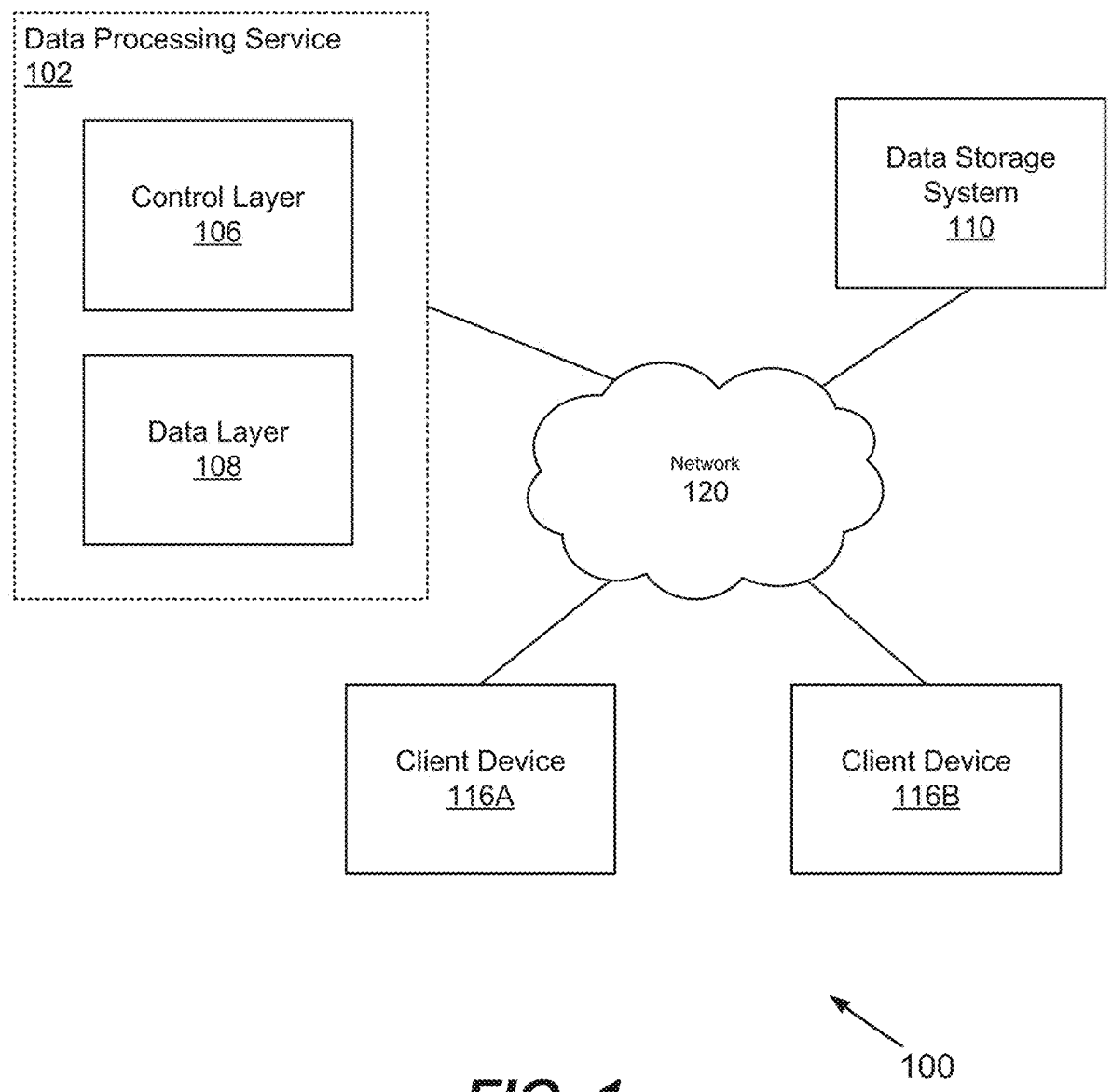
FIG. 1 is a high-level block diagram of a system environment for a data processing service, in accordance with an embodiment.

Figure (FIG. 1 is a high-level block diagram of a system environment 100 for a data processing service 102, in accordance with an embodiment. The system environment 100 shown by FIG. 1 includes one or more client devices 116A, 116B, a network 120, a data processing service 102, and a data storage system 110. In alternative configurations, different and/or additional components may be included in the system environment 100.

The data processing service 102 is a service for managing and coordinating data processing services to users of client devices 116. The data processing service 102 may manage one or more applications that users of client devices 116 can use to communicate with the data processing service 102. Through an application of the data processing service 102, the data processing system 102 may receive requests from users of client devices 116 to perform one or more data processing functionalities on data stored, for example, in the data storage system 110. The requests may include query requests, analytics requests, or machine learning and artificial intelligence requests, and the like, on data stored in the data storage system 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 receives data processing requests and coordinates with the data layer 108 to process the requests from client devices 116. The control layer 106 may schedule one or more jobs for a request or receive requests to execute one or more jobs from the user directly through a respective client device 116. The control layer 106 may distribute the jobs to components of the data layer 108 where the jobs are executed.

The control layer 106 is additionally capable of configuring the clusters in the data layer 108 that are used for executing the jobs. For example, a user of a client device 116 may submit a request to the control layer 106 to perform one or more queries and may specify that four clusters on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. In one instance, the clusters of computing resources are virtual machines or virtual data centers configured on a cloud infrastructure platform. In one instance, the data layer 108 is configured as a multi-tenant architecture where a plurality of data layer instances process data pertaining to various tenants of the data processing service 102. For example, a respective data layer instance can be implemented for a respective tenant. However, it is appreciated that in other embodiments, single tenant architectures may be used.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

The data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data and may include a commercially provided distributed storage system service (e.g., cloud-based storage system). Thus, the data storage system 110 may be managed by a separate entity than an entity that manages the data processing service 102 or the data management system 110 may be managed by the same entity that manages the data processing service 102.

The client devices 116 are computing devices that display information to users and communicates user actions to the systems of the system environment 100. While two client devices 116A, 116B are illustrated in FIG. 1, in practice many client devices 116 may communicate with the systems of the system environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate via the network 120, which may comprise any combination of local area and/or wide area networks, using both wired and/or wireless communication systems.

In one embodiment, a client device 116 executes an application allowing a user of the client device 116 to interact with the various systems of the system environment 100 of FIG. 1. For example, a client device 116 can execute a browser application to enable interaction between the client device 116 and the data processing system 106 via the network 120. In another embodiment, the client device 116 interacts with the various systems of the system environment 100 through an application programming interface (API) running on a native operating system of the client device 116, such as IOS® or ANDROID™

Control Layer Architecture

Figure 2:
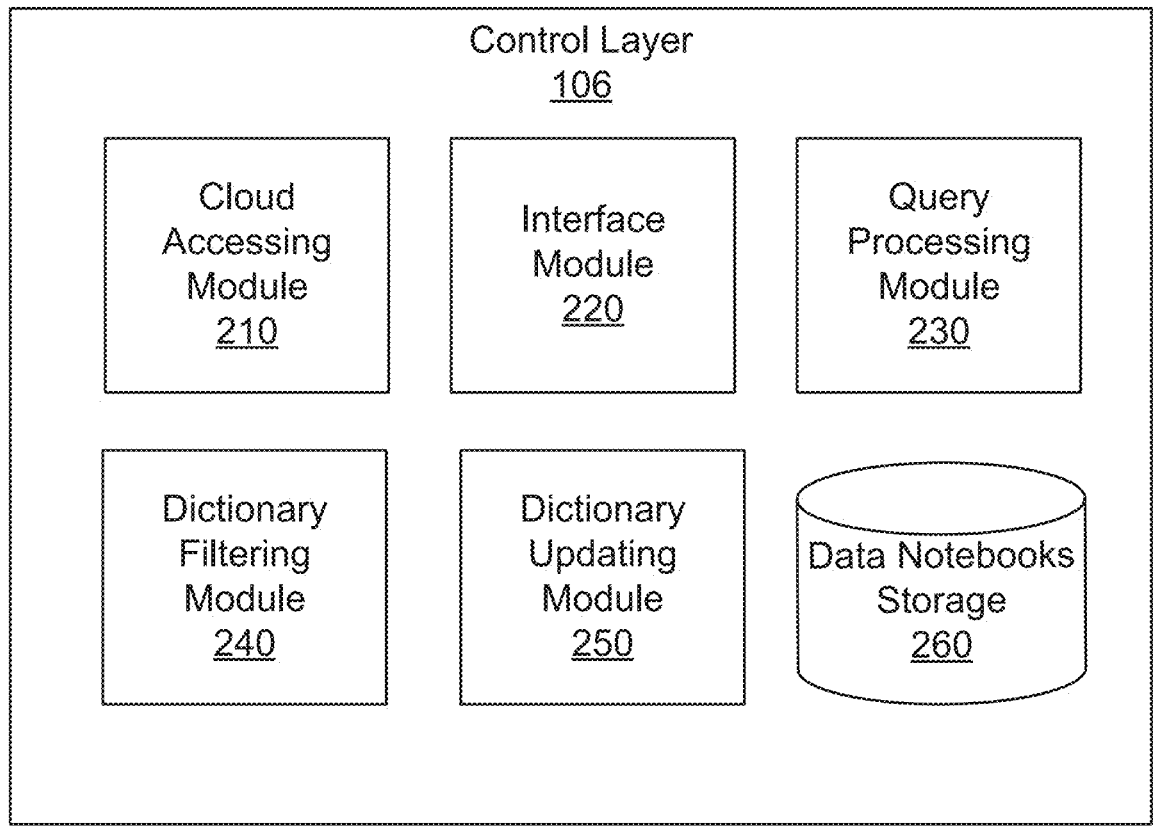
FIG. 2 illustrates a block diagram of an architecture of a data storage system, in accordance with some embodiments.

FIG. 2 is a block diagram of an architecture of a control layer 106, in accordance with an embodiment. In one embodiment, the control layer 106 includes a cloud accessing module 210, an interface module 220, a query processing module 230, a dictionary filtering module 240, a dictionary updating module 250, and a data notebooks storage 260.

The interface module 220 provides an interface and/or a workspace environment where users of client devices 116 (e.g., users associated with tenants) can access resources of the data processing service 102. For example, the user may retrieve information from data tables associated with a tenant, submit data processing requests such as query requests on the data tables, through the interface provided by the interface module 220. The interface provided by the interface module 220 may include notebooks, libraries, experiments, queries submitted by the user. In one embodiment, a user may access the workspace via a user interface (UI), a command line interface (CLI), or through an application programming interface (API) provided by the interface module 220.

For example, a notebook associated with a workspace environment may be a web-based interface to a document that includes runnable code, visualizations, and explanatory text. A user may submit data processing requests on data tables in the form of one or more notebook queries. The user provides code for executing the one or more queries and indications such as the desired time for execution, number of cluster worker nodes for the queries, cluster configurations, a notebook version, input parameters, authentication information, output storage locations, or any other type of indications for executing the queries. The user may also view or obtain results of executing the queries via the workspace.

The control layer 106 includes a query processing module 230. The query processing module 230 may receive an encoded query from client devices 116. The encoded query may be structured query language (SQL) encoded. The query may be a simple request to determine the presence of a value in a data table. The query may request to return all values from the data table that include or correspond to a desired value. The query could be a request for a data transaction or a request to determine the presence of a given value in the data. A complex query may be determined to be expensive, meaning that the estimated run-time for performing the query is large.

The query processing module 230 receives requests to execute one or more queries received from users through, for example, the workspace environment. In one embodiment, the one or more queries can include data processing operations such as data definition statements that create or modify the structure of database objects (e.g., DROP TABLE, DROP SCHEMA, CREATE DATABASE), data manipulation statements that add, change, or delete data from existing data tables (e.g., UPDATE, INSERT INTO, COPY INTO), query and data retrieval statements (e.g., Query, SELECT, VALUES), database management statements to manage data tables stored in the data storage system 108, and the like. The query processing module 230 provides the queries to the data layer 108 such that the jobs can be executed by one or more clusters and obtains results of executing the jobs. The query processing module 230 may provide the results of a query to the dictionary filtering module 240, further described below.

The query processing module 230 may produce filters to apply to data tables in response to a query. In some embodiments, the query processing module 230 produces a filter to determine the presence of a value in a data table. The query processing module 230 may produce a filter for dictionaries in a data table that have an associated column. Given a query, the query processing module 230 may produce a filter to perform a task associated with the query. The query processing module 230 may generate a filter associated with each column in a dataset. Filters from the query processing module 230 may be used to cancel requests for certain columns if the filter returns no relevant data from a column or a dictionary associated with the column. The query processing module 230 orders filters based on their estimated selectivity, in some embodiments. For example, the filter module 230 may apply filters to cached columns or dictionaries associated with cached columns first. For filters that rely on multiple dictionaries as input, the query processing module 230 applies filters that rely on the least number of input dictionaries first. The query processing module 230 applies less expensive filters first. For example, filters that rely on integer values are less expensive than string or Regular expression (Regex) filters, so integer filters are applied before string and Regex filters. The query processing module 230 may generate filters to run on updated dictionaries generated by the dictionary updating module 250.

Figure 3:
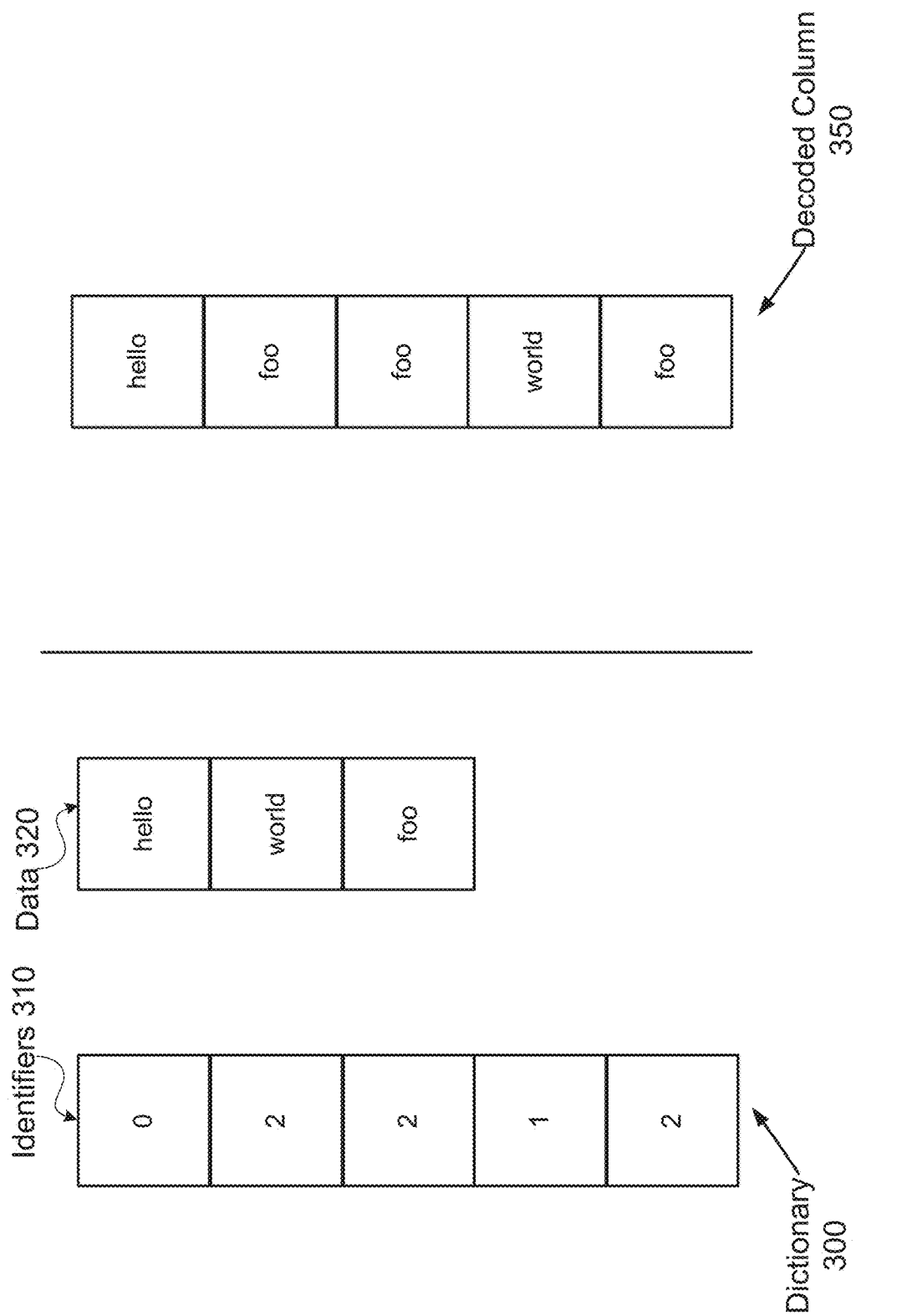
FIG. 3 is a diagram showing a dictionary and a decoded column, in accordance with some embodiments.

The control layer 106 further includes the dictionary filtering module 240. The dictionary filtering module 240 enables the dictionary filtering approach to executing a query. The dictionary filtering approach comprises determining whether a value of interest is present in a dictionary associated with a column before the column is decoded and filtered. Turning to FIG. 3, a dictionary 300 associated with a column comprises an encoding of identifiers 310 for data 320. As depicted in FIG. 3, the data value "hello" in a column is encoded as the identifier "0" in the dictionary 300. The original column, illustrated as the decoded column 350, contains redundant strings over multiple rows. The dictionary 300 encodes the strings into identifiers 310. Querying over dictionaries containing integer identifiers may be less expensive and require less run-time than querying over decoded columns that contain larger data values per row. Additionally, decoding a dictionary 300 into a decoded column 350 may be an expensive operation, depending on the size of the dictionary 300, data 320, and the decoded column 350. Similarly, if the data 320 contains large strings, then the query is more expensive as copying the strings repeatedly takes additional time.

Figure 4:
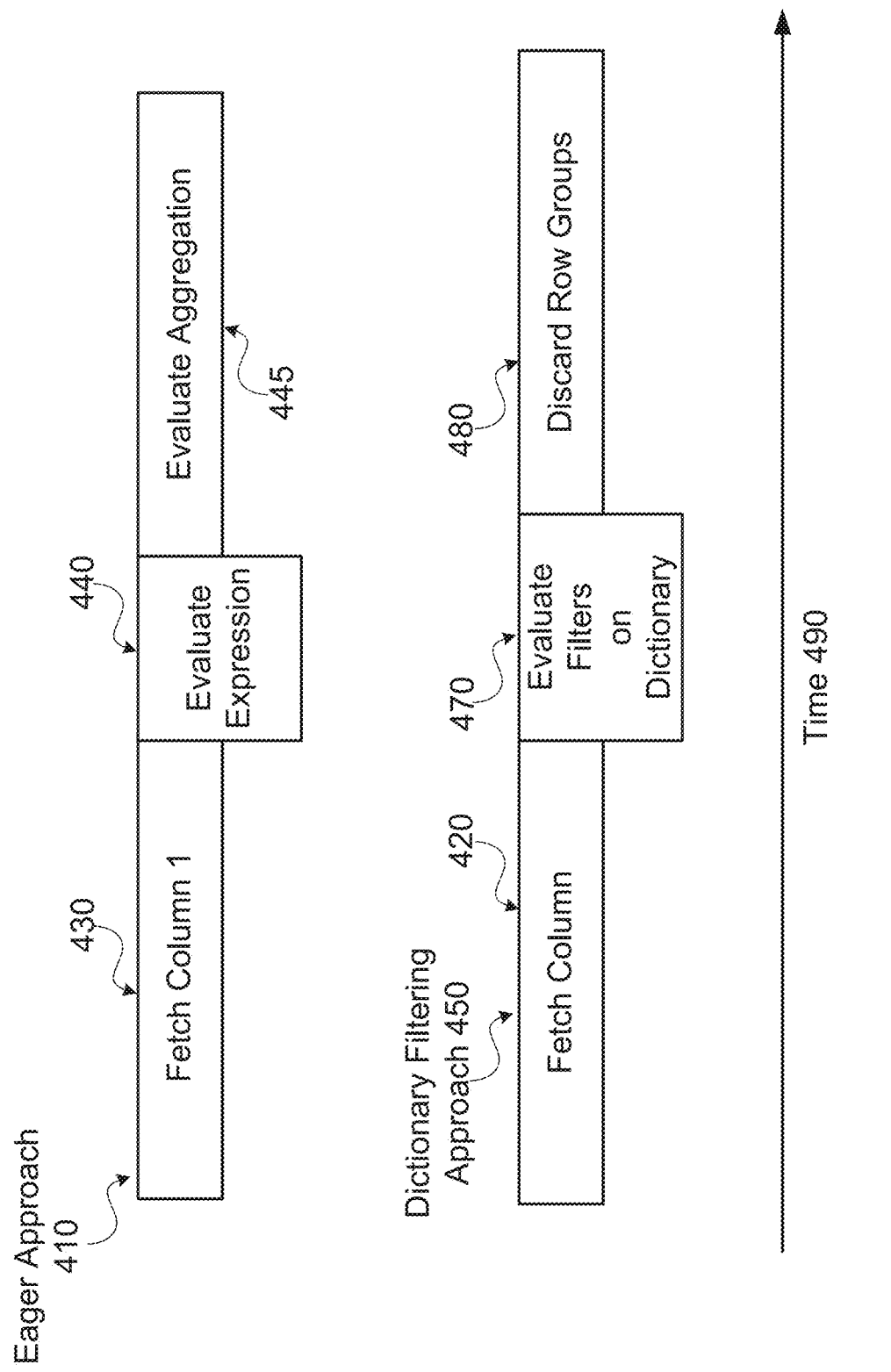
FIG. 4 is a diagram showing an eager approach and a dictionary filtering approach, in accordance with some embodiments.

Turning to FIG. 4, the dictionary filtering approach is illustrated against an eager approach 410. The eager approach 410 comprises fetching a first column 430. The eager approach 410 evaluates an expression 440 comprising an operator or a request on the column 430 to determine the presence of a value in the columnar dataset on the first column 430. The eager approach 410 evaluates an aggregation 445 of resulting rows in the first column 430. The eager approach 410 may be unnecessarily expensive if an entire column is filtered, but does not contain the value of interest or if the column only contains very few values pertinent to an operator.

The dictionary filtering module 240 enables the dictionary filtering approach 450. The dictionary filtering approach 450 fetches a column 420. If the column 420 is dictionary encoded, the dictionary filtering approach 450 initially evaluates 470 filters on the dictionary rather than on the decoded column 420, as in the eager approach 410. If the column 420 is not dictionary encoded, the dictionary filtering module 240 defaults to the eager approach 410. The columnar dataset may contain one or more columns based on a dictionary. The dictionary filtering approach 450 evaluates 470 a filter on the dictionary. The filter may be based on an expression from the query. The expression may contain an operator from the query. The expression may contain a request to return information about a value of interest in the columnar dataset. In some embodiments, the request to return information about a value of interest may be a request to determine the presence of a value of interest in the columnar dataset. In some embodiments, evaluating 470 the filter on the dictionary comprises returning information about the number of instances of the value of interest, or the row locations of the value of interest. Based on the results of evaluating 470 the filter on the dictionary, the dictionary filtering approach 450 may discard of row groups. In some embodiments, the filter is evaluated 470 on each row group encoded in the dictionary. If no row groups contain a value that satisfies the filter, the row groups are discarded 480, and the query run is over. If the dictionary contains at least one row group that contains a value that satisfies the filter, the column 420 is decoded and the filter is applied to the decoded column. This may cause query regression, due to the data processing service 102 evaluating the filter twice, once on the dictionary and again on the column 420.

The dictionary filtering approach 450 may increase the efficiency of a query by eliminating a row group based on the dictionary associated with the column 420 (e.g., filter column). A row group is a batch of rows encoded as a column. For example a row group may include a group or rows (e.g., rows 1, 2, & 3) from a set of columns (e.g., columns 1 & 2). The dictionary filtering approach 450 may eliminate a row group if all values in the row group associated with the column 420 (e.g., filter column) fail the dictionary filter. A value in the row group fails the dictionary filter if it is not relevant to the query and/or operator that the dictionary filter is performing. In some embodiments, a row group fails the dictionary filter if an identifier 310 associated with the data 320 in the row group is not relevant to a query. Given this determination, row groups in the column 420 associated with the irrelevant data 320 may be eliminated. In some embodiments, if the dictionary contains instances of the value of interest and the column 420 is consequently fetched or decoded and filtered, the dictionary filtering approach 450 may cause regression. Fetching data from cloud storage incurs cost, so fetching the dictionary and subsequently fetching the column is an increase in the cost of the query. In some embodiments, if the dictionary contains instances of the value of interest, the column 420 is decoded and the filter is evaluated 470 on the decoded column. This causes regression because filtering is applied to both the dictionary and the decoded column.

To limit regression in the dictionary filtering approach 450, the dictionary filtering module 240 may enact a variety of strategies. In some embodiments, the dictionary filtering module 240 determines whether to perform dictionary filtering for a query by calculating a metric. The metric may be based on one or more factors. The factors include, at least, the size of a dictionary, a number of rows, and an estimated cost of evaluating the expression on the dictionary. In some embodiments, multiple dictionaries may be queried and the dictionary filtering module 240 includes the sizes of multiple dictionaries as factors in calculating the metric. The calculated metric increases as the expense of an expression and the size of a dictionary increase, in accordance with some embodiments. By way of example, an expression may be considered inexpensive if it is from the list: "LessThan," "GreaterThanOrEqual," "Less ThanOrEqual," "EqualTo," "GreaterThan," "Not," and "In." An expression may be considered expensive if it includes an expression from the list: "Invoke," "StartsWith," "InSet," "CaseWhen," "Contains," or "EqualNullSafe." The dictionary filtering module 240 may preferentially apply the dictionary filtering approach 450 to queries containing less expensive expressions.

The dictionary filtering module 240 may have a user-defined or predetermined threshold value for the metric. If the metric is below the threshold, the dictionary filtering module 240 performs dictionary filtering. When the metric is below the threshold, the dictionary filtering approach 450 is likely to be more efficient than the eager approach 410. If the metric is equal to or above the threshold, the dictionary filtering module 240 defers to an eager approach 410. In accordance with the eager approach 410, when the metric is above the threshold, the query processing module 230 accesses the column associated with the dictionary and determines whether the value of interest is present in the column.

The dictionary filtering module 240 may use a machine learning model to determine whether to perform dictionary filtering. Inputs to the machine learning model may include a dictionary size, an associated column size, and an estimated cost of evaluating the expression on the dictionary. The machine learning model may be trained on data including at least dictionary sizes and an estimated cost of executing the query. The machine learning model may determine whether to perform dictionary filtering by calculating a metric indicating a probability of query regression in applying the dictionary filtering approach. The metric may increase based on the dictionary size or the column size increasing. The metric may increase based on the estimated expense of the query increasing. The output of the machine learning model may be a binary value with "0" indicating a recommendation to not apply the dictionary filtering approach and "1" indicating a recommendation to apply the dictionary filtering approach.

In some embodiments, the dictionary filtering module 240 continuously monitors query regression while performing dictionary filtering. Query regression may be measured as an increase in processor (e.g., a central processing unit (CPU)) time and duration, and as a number of cloud I/O requests. In some embodiments, query regression may comprise a lack of eliminated row groups in a dictionary, indicating that columns associated with the row group will have to be fetched. In response to the query regression being above a threshold percentage, the dictionary filtering module 240 aborts dictionary filtering and defaults to the eager approach 410. The threshold percentage may represent a percent increase in CPU time and duration. In some embodiments, the threshold percentage may represent a percentage of row groups retained after passing a filter over a dictionary.

The control layer 106 further comprises a dictionary updating module 250. The dictionary updating module 250 evaluates operators on one or more values of a dictionary to generate an updated dictionary comprising updated values. Updating an entire column may be compute resource expensive and time consuming. Updating a dictionary, however, is more efficient. By way of example, in one embodiment an operator called "Upper" is passed on a dictionary associated with a column. The goal of Upper is to capitalize all values in a given column. Referencing the dictionary 300 in FIG. 3, the identifiers 310 are not modified in evaluating the operator on the dictionary. Instead, the dictionary updating module 250 updates the data 320 corresponding with the identifiers 310 is updated to be all-capitalized, generating an updated dictionary. In a subsequent step, the dictionary updating module 250 decodes the updated dictionary for each row in the column. Decoding the updated dictionary, in this embodiment, generates a decoded column 350 containing values that are all-capitalized. To produce a decoded column 350, the data processing service 102 may decode dictionary-encoded values in a dictionary associated with a column.

Figure 5:
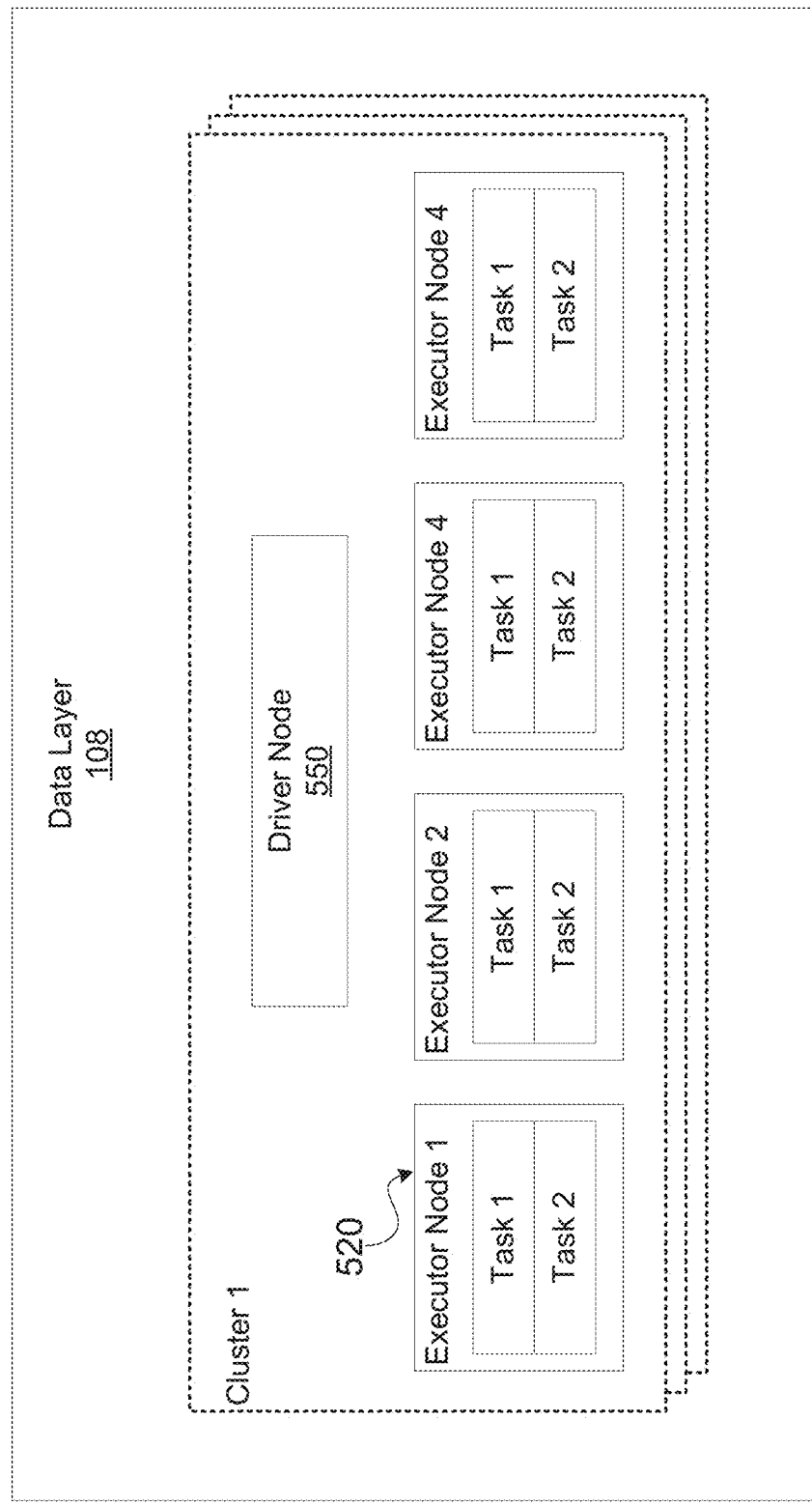
FIG. 5 illustrates a block diagram of a data layer, in accordance with some embodiments.

Turning to FIG. 5, the dictionary filtering module 240 or the dictionary updating module 250 may further be structured with data layers 108 for creating and executing queries on tasks. FIG. 5 is a block diagram of an architecture of a data layer 108, in accordance with an embodiment. In some embodiments, the data layer 108 includes driver node 550 and worker pool including multiple executor nodes 520. The driver node 550 receives one or more jobs associated with a query for execution and provides job stages to executor nodes 520 in the form of tasks. The driver node 550 may receive task results from the executor nodes 520 of the worker pool, and assemble task results into complete query results, and the like.

The worker pool includes any appropriate number of executor nodes 520 (e.g., 4 executor nodes, 12 executor nodes, 253 executor nodes, and the like). An executor node 520 of the worker pool includes one or more execution engines for executing one or more tasks of a job stage. In one embodiment, an execution engine performs single-threaded task execution in which a task is processed using a single thread of a processor. It is noted that a processor is at least one processor (e.g., at least one central processing unit (CPU)). The executor node 520 distributes one or more tasks for a job stage to the one or more execution engines and provides the results of the execution to the driver node 550. A task is a subset of the row groups containing dictionary encoded columns, according to some embodiments.

The data layer 108 may also include an allocation system (not shown) for autoscaling using file access or cache usage. For example, the allocation system may increase or decrease a task size based on executor node 520 usage.

Example Dictionary Filtering Embodiment

Figure 6:
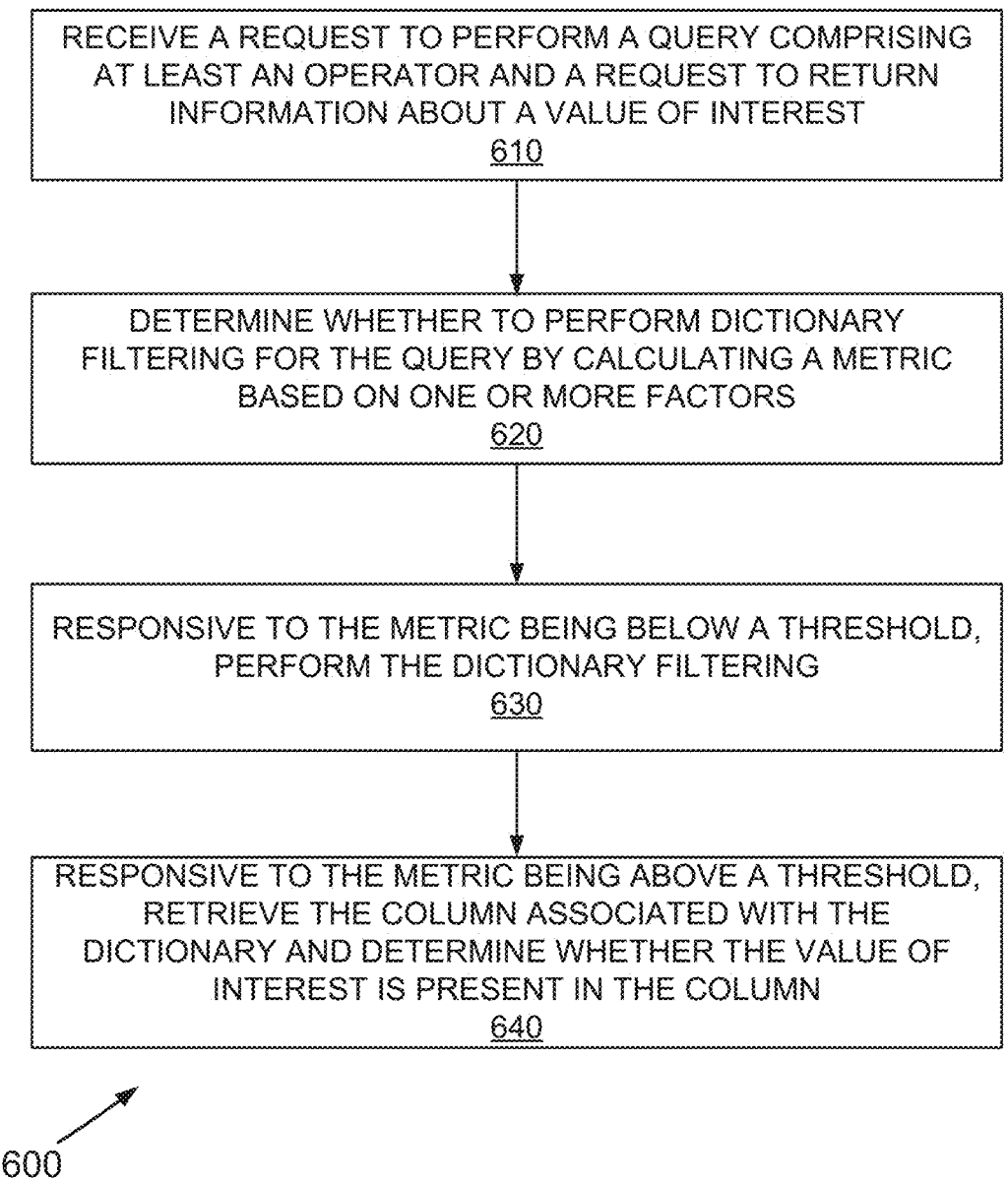
FIG. 6 is a flowchart illustrating a method for applying dictionary filtering, in accordance with some embodiments.

Referring to FIG. 6, a process 600 is depicted for determining whether to apply a dictionary filtering approach. The process 600 may be executed by at least one processor (a processor). The data processing service 102 receives 610 a request to perform a query comprising at least an operator and a request to return information about a value of interest. The value of interest may be a string, an integer, or another data value. The query comprises a request to return information in a columnar dataset stored on cloud storage. At least one column in the columnar dataset is based on a dictionary or has an associated dictionary encoding. The dictionary maps one or more values for the column to one or more respective identifiers.

The data processing service 102 determines 620 whether to perform dictionary filtering for the query by calculating a metric based on one or more factors. The one or more factors involved in calculating the metric may include, at least, a size of the dictionary and an estimated cost of evaluating the expression on the dictionary. The cost may be considered reasonable if a number of expressions being evaluated on a row group is less than a certain threshold, a size of the dictionary or number of rows in a row group is less than a certain threshold, and the expression is inexpensive. Dictionary filtering includes determining whether the value of interest is present in the dictionary for a decoded column before the column is decoded and filtered. A machine learning model may be used to determine whether to perform dictionary filtering. The machine learning model may be trained on data comprising at least a plurality of dictionary sizes and the costs of evaluating a plurality of expressions on the dictionaries. The machine learning model may determine whether to perform the dictionary filtering by calculating a metric. In some embodiments, the metric may correspond to a likelihood that performing dictionary filtering will cause query regression and/or a decrease in CPU efficiency for the query.

The data processing service 102 retains a threshold for the metric. If the metric falls below the threshold, the data processing service 102 performs 630 the dictionary filtering. The metric falling below the threshold may indicate a low likelihood of query regression and CPU inefficiency in applying the dictionary filtering approach. If the metric falls above or equal to the threshold, the data processing service 102 may retrieve 640 the column associated with the dictionary and determines whether the value of interest is present in the column. If the metric is above or equal to the threshold, the data processing service 102 resorts to the eager approach 410.

Evaluating Expressions Over Dictionary Data

Figure 7:
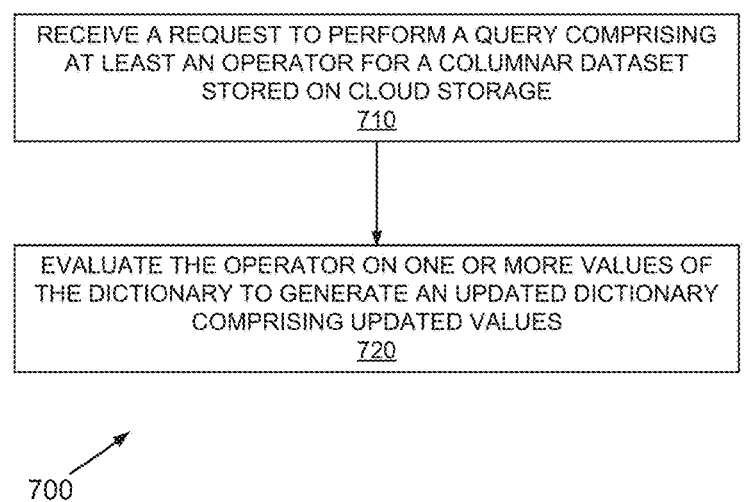
FIG. 7 is a flowchart illustrating a method for evaluating operators on dictionaries, in accordance with some embodiments.

Turning to FIG. 7, the data processing service 102 may evaluate expressions over dictionaries in a process 700. The data processing service 102 may receive 710 a request to perform a query comprising at least an operator for a columnar dataset stored on cloud storage. The query may include a unary expression with two dictionary column inputs, in some embodiments. The columnar dataset comprises at least one column based on a dictionary or associated with a dictionary. The dictionary maps one or more values for the column to one or more respective identifiers.

The data processing service 102 evaluates 720 the operator on one or more values of the dictionary to generate an updated dictionary comprising updated values. In an embodiment, an operator is evaluated for capitalizing all values in the column. In this embodiment, the data processing service 102 evaluates 720 the operator on the dictionary encoding of the column, rather than the entire column itself. The data processing service 102 generates an updated dictionary comprising capitalized data values. In a subsequent step, the data processing service 102 may decode the dictionary into an updated column containing updated data values. This may increase the efficiency of evaluating the operator on a columnar dataset.

Evaluating expressions over dictionary data may be hybridized with the dictionary filtering approach. In an embodiment, a query includes at least an operator and a request to return information about a value of interest in the columnar dataset stored on cloud storage. The dictionary filtering approach may be applied to determine whether the value of interest is present in the dictionary for the column before evaluating the operator on the one or more values of the dictionary. In some embodiments, given a query comprising at least an operator and a request to return information about a value of interest in the columnar dataset, the data processing service 102 determines whether to perform dictionary filtering. The data processing service 102 calculates a metric based on one or more factors comprising at least dictionary size and an estimated cost of executing the query. If the metric is below a threshold, the data processing service 102 performs dictionary filtering prior to evaluating the operator on the dictionary. If the metric is above a threshold, the column is retrieved, and the operator is evaluated on the column.

Example Computing System Architecture

Figure 8:
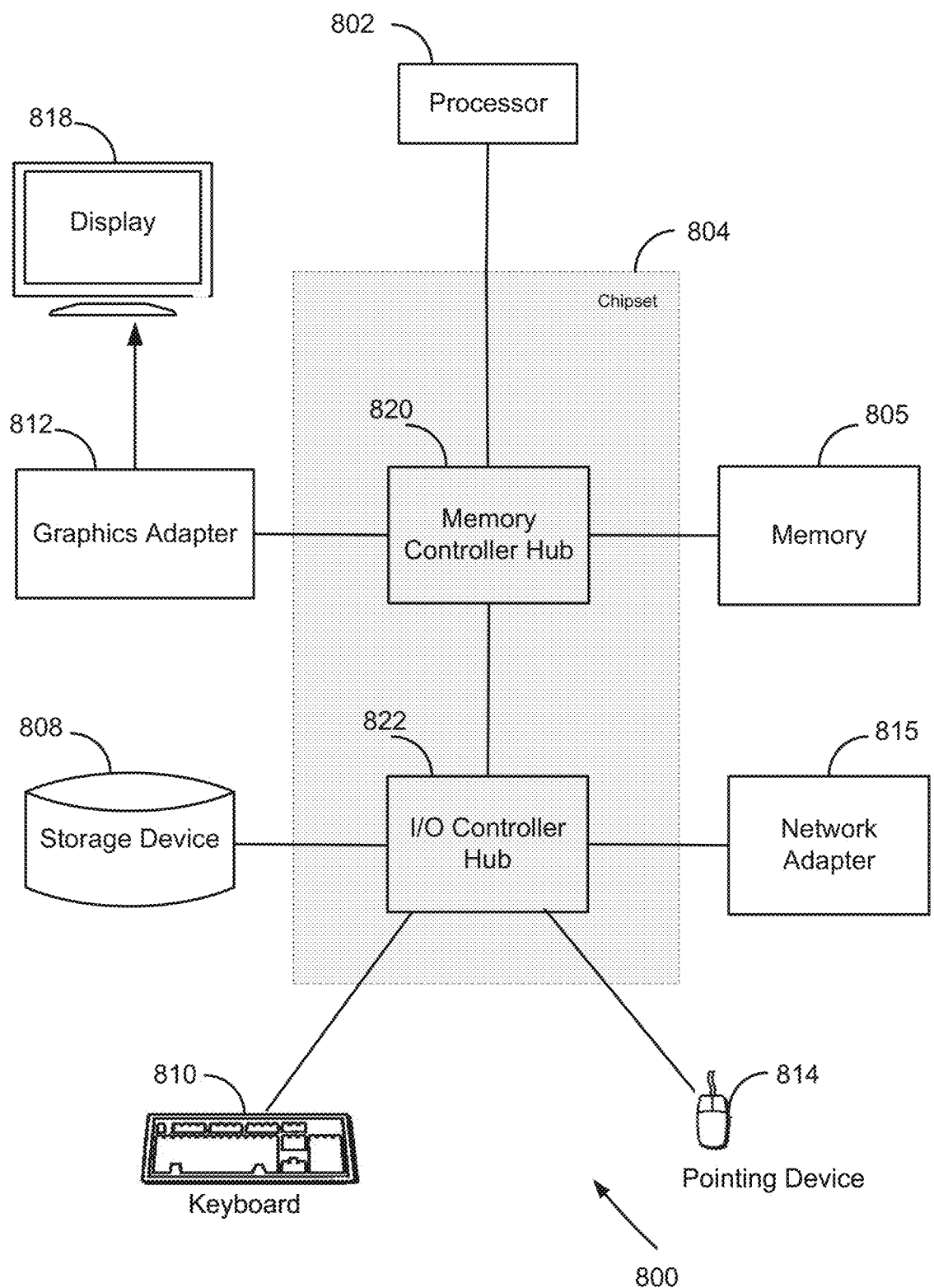
FIG. 8 is a block diagram of an example computing device architecture in accordance with one embodiment.

FIG. 8 is a block diagram of an example computer 800 suitable for use in running a query on a columnar dataset, in accordance with an embodiment. The example computer 800 includes at least one processor (generally, a processor) 802 coupled to a chipset 804. The chipset 804 includes a memory controller hub 820 and an input/output (I/O) controller hub 822. At least one memory (generally, a memory) 805 and a graphics adapter 812 are coupled to the memory controller hub 820, and a display 818 is coupled to the graphics adapter 812. A storage device 808, keyboard 810, pointing device 814, and network adapter 815 are coupled to the I/O controller hub 822. Other embodiments of the computer 800 have different architectures.

In the embodiment shown in FIG. 8, the storage device 808 is a non-transitory computer-readable storage medium such as a hard drive, compact disk read-only memory (CD-ROM), DVD, or a solid-state memory device. The non-transitory computer readable storage medium and/or the memory 805 store instructions and data that by be executed by the processor 802. The pointing device 814 is a mouse, track ball, touch-screen, or other type of pointing device, and may be used in combination with the keyboard 810 (which may be an on-screen keyboard) to input data into the computer system 800. The graphics adapter 812 displays images and other information on the display 818. The network adapter 815 couples the computer system 800 to one or more computer networks, such as network 120.

The types of computers used by the processing entities of FIG. 1 can vary depending upon the embodiment and the processing power required by the entity. For example, data processing service 102 might include multiple blade servers working together to provide the functionality described. Furthermore, the computers can lack some of the components described above, such as keyboards 810, graphics adapters 812, and displays 818.

ADDITIONAL CONSIDERATIONS

The disclosed configurations provide example benefits including an increased efficiency of processing a query for a dataset. In some embodiments, a dictionary associated with a column is a smaller data file than the column itself. In determining the presence of a data value in the column, filtering over the dictionary may be less expensive than retrieving and filtering over the column itself. Further, some columns may only be dictionary encoded. In such cases, it may be necessary to decode the dictionary and then filter over the full column. Dictionary filtering provides an alternative approach to performing a query on columnar datasets by first filtering over the dictionary. In embodiments where a query further comprises an operator, evaluating the operator over a dictionary may be less expensive than evaluating over an entire column associated with the dictionary. If a value of interest associated with the operator is not present in the column or is unlikely to be present in the column, then it may be more efficient to evaluate the operator over the dictionary associated with the column.

The foregoing description of the embodiments have been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the disclosed subject matter. It is therefore intended that the scope be limited not by this detailed description, but rather by any claims that issue on an application based hereon. Accordingly, the disclosure of the embodiments is intended to be illustrative, but not limiting, of the scope of the disclosed embodiments, which is set forth in the following claims.

What is claimed is:

1. A method comprising:
   receiving a request to perform a query, the query comprising at least an operator and a request to return information about a value of interest in a columnar dataset stored on cloud storage, wherein
      the query is associated with a filter generated to apply to the columnar dataset in response to the query,
      at least one column in the columnar dataset is based on a dictionary, and
      the dictionary maps one or more values for a column to one or more respective identifiers;
   calculating a metric representing a likelihood that performing dictionary filtering will cause query regression based on at least a size of the dictionary and an estimated cost of evaluating the filter on the dictionary;
   determining whether to perform dictionary filtering based on the metric by comparing the metric to a threshold; and
   executing, responsive to the determination, one of:
      performing dictionary filtering, the dictionary filtering comprising evaluating the filter on the dictionary before evaluating the filter on the column, and
      retrieving the column associated with the dictionary and determining whether the value of interest is present in the column.

2. The method of claim 1, wherein performing dictionary filtering further comprises eliminating a row group of the column.

3. The method of claim 2, wherein the row group of the column is eliminated if all values in the row group fail the filter.

4. The method of claim 1, wherein the metric increases based on the size of the dictionary increasing.

5. The method of claim 1, wherein performing dictionary filtering further comprises:
   monitoring query regression while dictionary filtering; and
   aborting the dictionary filtering early in response to the query regression being above a threshold percentage.

6. The method of claim 1, wherein calculating the metric based on at least the size of the dictionary and the estimated cost of evaluating the filter on the dictionary comprises calculating the metric with a machine learning model trained on data comprising at least a plurality of sizes of dictionaries and a plurality of estimated costs of evaluating filters on dictionaries.

7. The method of claim 1, wherein the metric represents a likelihood that performing dictionary filtering will cause a decrease in central processing unit (CPU) efficiency for the query.

8. A system comprising:
   a processor; and
   a memory coupled with the processor and comprising stored instructions, the stored instructions executable by a processor and when executed cause the system to:
      receive a request to perform a query, the query comprising at least an operator and a request to return information about a value of interest in a columnar dataset stored on cloud storage, wherein
the query is associated with a filter generated to apply to the columnar dataset in response to the query,
at least one column in the columnar dataset is based on a dictionary, and
the dictionary maps one or more values for a column to one or more respective identifiers;
calculate a metric representing a likelihood that performing dictionary filtering will cause query regression based on at least a size of the dictionary and an estimated cost of evaluating the filter on the dictionary;
determine whether to perform dictionary filtering based on the metric by comparison of the metric to a threshold; and
execute, responsive to the determination, one of:
performance of dictionary filtering by evaluating the filter on the dictionary before evaluating the filter on the column, and
retrieval of the column associated with the dictionary and determination of whether the value of interest is present in the column.

9. The system of claim 8, wherein the stored instructions to execute performance of the dictionary filtering further comprise instructions that when executed cause the system to eliminate a row group of the column.

10. The system of claim 9, wherein the row group of the column is eliminated if all values in the row group fail the filter.

11. The system of claim 8, wherein the metric increases based on the size of the dictionary increasing.

12. The system of claim 8, wherein the stored instructions to execute the performance of dictionary filtering further comprise instructions that when executed cause the system to:
monitor query regression while dictionary filtering; and
abort the dictionary filtering early when the query regression is above a threshold percentage.

13. The system of claim 8, wherein the stored instruction to calculate the metric based on at least the size of the dictionary and the estimated cost of evaluating the filter on the dictionary comprise instructions that when executed cause the system to calculate the metric with a machine learning model trained on data comprising at least a plurality of sizes of dictionaries and a plurality of estimated costs of evaluating filters on dictionaries.

14. The system of claim 8, wherein the metric represents a likelihood that performing dictionary filtering will cause a decrease in central processing unit (CPU) efficiency for the query.

15. A non-transitory computer readable medium comprising stored instructions encoded thereon that, when executed by a processor, cause at least one processor to:

receive a request to perform a query, the query comprising at least an operator and a request to return information about a value of interest in a columnar dataset stored on cloud storage, wherein
the query is associated with a filter generated to apply to the columnar dataset in response to the query,
at least one column in the columnar dataset is based on a dictionary, and
the dictionary maps one or more values for a column to one or more respective identifiers;
calculate a metric representing a likelihood that performing dictionary filtering will cause query regression based on at least a size of the dictionary and an estimated cost of evaluating the filter on the dictionary;
determining whether to perform dictionary filtering based on the metric by comparison of the metric to a threshold; and
execute, responsive to the determination, one of:
performance of dictionary filtering by evaluating the filter on the dictionary before evaluating the filter on the column, and
retrieval of the column associated with the dictionary and determination of whether the value of interest is present in the column.

16. The non-transitory computer readable medium of claim 15, wherein the stored instructions to execute the performance of dictionary filtering further comprise stored instructions that when executed cause the processor to eliminate a row group of the column.

17. The non-transitory computer readable medium of claim 15, wherein the metric increases based on the size of the dictionary increasing.

18. The non-transitory computer readable medium of claim 15, wherein the stored instructions to execute the performance of the dictionary filtering further comprise stored instructions that when executed cause the processor to:
monitor query regression while dictionary filtering; and
abort the dictionary filtering early when the query regression is above a threshold percentage.

19. The non-transitory computer readable medium of claim 15, wherein the stored instructions to calculate the metric based on at least the size of the dictionary and the estimated cost of evaluating the filter on the dictionary comprise instructions that when executed cause the processor to calculate the metric with a machine learning model trained on data comprising at least a plurality of sizes of dictionaries and a plurality of estimated costs of evaluating filters on dictionaries.

20. The non-transitory computer readable medium of claim 15, wherein the metric represents a likelihood that performing dictionary filtering will cause a decrease in central processing unit (CPU) efficiency for the query.

* * * * *